United States Patent
Reddy et al.

(10) Patent No.: US 11,483,243 B2
(45) Date of Patent: *Oct. 25, 2022

(54) SMARTER POLICY DECISIONS BASED ON METADATA IN DATA FLOWS

(71) Applicant: Cisco Technology, Inc., San Jose, CA (US)

(72) Inventors: K. Tirumaleswar Reddy, Bangalore (IN); Ram Mohan Ravindranath, Bangalore (IN); Muthu Arul Mozhi Perumal, Bangalore (IN); Daniel G. Wing, San Jose, CA (US); William C. VerSteeg, Buford, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/434,523

(22) Filed: Jun. 7, 2019

(65) Prior Publication Data

US 2019/0288945 A1  Sep. 19, 2019

Related U.S. Application Data

(63) Continuation of application No. 14/194,348, filed on Feb. 28, 2014, now Pat. No. 10,320,676.

(51) Int. Cl.
*H04L 47/10* (2022.01)
*H04L 47/70* (2022.01)
(Continued)

(52) U.S. Cl.
CPC .......... *H04L 47/10* (2013.01); *H04L 47/2441* (2013.01); *H04L 47/70* (2013.01);
(Continued)

(58) Field of Classification Search
CPC ..... H04L 47/10; H04L 65/80; H04L 47/2441; H04L 63/10; H04L 65/60; H04L 67/10; H04L 47/70; H04L 63/0263
(Continued)

(56) References Cited

U.S. PATENT DOCUMENTS 7,945,685 B2   5/2011  Kleyman et al.
8,676,993 B1*  3/2014  Zhao ...................... H04L 69/16
                                                        709/227
(Continued)

OTHER PUBLICATIONS

Holmberg, C., et al., "Multiplexing Negotiation Using Session Description Protocol (SDP) Port Numbers," MMUSIC Working Group Internet Draft, draft-ietf-mmusic-sdp-bundle-negotiation-04.txt, Jun. 14, 2013, 26 pages.
(Continued)

*Primary Examiner* — Meng Vang
(74) *Attorney, Agent, or Firm* — Polsinelli

(57) ABSTRACT

Modern day user applications leverages new communication technologies such as WebRTC, WebEx, and Jabber allow devices to connect and exchange media content including audio streams, video streams, and data stream/channels. The present disclosure describes mechanisms for a Port Control Protocol (PCP) server to provide feedback to PCP clients to enforce certain policies on the transport of such media content for a network. A policy may include a traffic handling policy for enforcing differentiated quality of service characteristics for different types of media streams. Another policy may include a security policy ensuring a data files being transmitted over a data channel from one endpoint travels to a security application via a relay element before the packets reaches another endpoint. The mechanisms are transparent to the endpoints, and advantageously preserve the user experience for these user applications.

19 Claims, 10 Drawing Sheets

(51) Int. Cl.
*H04L 47/2441* (2022.01)
*H04L 65/80* (2022.01)
*H04L 9/40* (2022.01)
*H04L 65/60* (2022.01)
*H04L 67/10* (2022.01)

(52) U.S. Cl.
CPC ............. *H04L 63/10* (2013.01); *H04L 65/60* (2013.01); *H04L 65/80* (2013.01); *H04L 67/10* (2013.01); *H04L 63/0263* (2013.01)

(58) Field of Classification Search
USPC ........................................................ 709/225
See application file for complete search history.

(56) References Cited

U.S. PATENT DOCUMENTS

| | | | |
|---|---|---|---|
| 8,813,214 | B1 | 8/2014 | McNair et al. |
| 8,949,413 | B2 | 2/2015 | Ramaraj et al. |
| 8,984,151 | B1 | 3/2015 | Hsieh et al. |
| 2001/0014091 | A1* | 8/2001 | Yamada ................ H04L 1/1819 370/349 |
| 2001/0034223 | A1* | 10/2001 | Rieser .................... H04L 29/06 455/404.2 |
| 2003/0172220 | A1* | 9/2003 | Hao ...................... H04L 47/266 710/305 |
| 2004/0010545 | A1 | 1/2004 | Pandya |
| 2005/0108397 | A1 | 5/2005 | Basso et al. |
| 2006/0041688 | A1 | 2/2006 | Wright et al. |
| 2006/0265512 | A1* | 11/2006 | Allen ................. H04N 21/2381 709/231 |
| 2008/0005392 | A1* | 1/2008 | Amini .................... H04L 65/80 710/29 |
| 2008/0219176 | A1* | 9/2008 | Yamada ................. H04L 47/15 370/252 |
| 2009/0257450 | A1 | 10/2009 | Sirigiri et al. |
| 2010/0183000 | A1* | 7/2010 | Nakayama ........... H04N 21/242 370/352 |
| 2011/0208871 | A1 | 8/2011 | Mann et al. |
| 2012/0120799 | A1 | 5/2012 | Brisebois et al. |
| 2014/0122634 | A1 | 5/2014 | Conner et al. |

OTHER PUBLICATIONS

Jesup, R., "RTCWeb Data Channels," Network Working Group Internet Draft, d raft-ietf-rtcweb-data-channel-o5.b(t, Jul. 15, 2013; 13 pages.

Perkins, C., "Web Real-Time Communication (WebRTC): Media Transport and Use of RTP," Network Working Group Internet-Draft, draft-ietf-rtcweb-rtp-usage-06, Feb. 25, 2013, 62 pages.

Reddy, T., "Improving ICE Interface Selection Using Port Control Protocol (PCP) Flow Extension," MMUSIC Working Group Internet-Draft, draft-reddy-mmusic-ice-best-interface-pcp-00, Oct. 10, 2013, 16 pages.

Wing, D., "PCP Flowdata Option," PCP Working Group Internet Draft, draft-wing-pcp-flowdata-00, Jul. 3, 2013, 17 pages.

Mahy, R., "Traversal Using Relays Around NAT (TURN): Relay Extensions to Session Traversal Utilities for NAT (STUN)," IETF RFC5766, Apr. 2010, 134 pages.

Wing, D., et al., "Port Control Protocol (PCP)," IETF RFC6887, Apr. 2013, 176 pages.

Wing, D., et al., "PCP Flowdata Option," draft-wing-pcp-flowdata-oo, Aug. 2013, IETF 87 Meeting, 16 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Option Code=TBA|   Reserved    |        Option Length=24       |
+-+-+-+-+-+-+-+-+-+-+-+-+-+-+-+-+-+-+-+-+-+-+-+-+-+-+-+-+-+-+-+-+
|                      Instance Identifier                      |
+-+-+-+-+-+-+-+-+-+-+-+-+-+-+-+-+-+-+-+-+-+-+-+-+-+-+-+-+-+-+-+-+
| uDT | uLT | uJT |    RSVD1    | dDT | dLT | dJT |    RSVD2    |
+-+-+-+-+-+-+-+-+-+-+-+-+-+-+-+-+-+-+-+-+-+-+-+-+-+-+-+-+-+-+-+-+
|                   Upstream Minimum Bandwidth                  |
+-+-+-+-+-+-+-+-+-+-+-+-+-+-+-+-+-+-+-+-+-+-+-+-+-+-+-+-+-+-+-+-+
|                  Downstream Minimum Bandwidth                 |
+-+-+-+-+-+-+-+-+-+-+-+-+-+-+-+-+-+-+-+-+-+-+-+-+-+-+-+-+-+-+-+-+
|                   Upstream Maximum Bandwidth                  |
+-+-+-+-+-+-+-+-+-+-+-+-+-+-+-+-+-+-+-+-+-+-+-+-+-+-+-+-+-+-+-+-+
|                  Downstream Maximum Bandwidth                 |
+-+-+-+-+-+-+-+-+-+-+-+-+-+-+-+-+-+-+-+-+-+-+-+-+-+-+-+-+-+-+-+-+
```

FIGURE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Option Code=TBA|   Reserved    |       Option Length=24        |
+-+-+-+-+-+-+-+-+-+-+-+-+-+-+-+-+-+-+-+-+-+-+-+-+-+-+-+-+-+-+-+-+
|                            Reserved                           |
+-+-+-+-+-+-+-+-+-+-+-+-+-+-+-+-+-+-+-+-+-+-+-+-+-+-+-+-+-+-+-+-+
|AuDT|AuLT|AuJT|   RSVD1       |AdDT|AdLT|AdJT|      RSVD2      |
+-+-+-+-+-+-+-+-+-+-+-+-+-+-+-+-+-+-+-+-+-+-+-+-+-+-+-+-+-+-+-+-+
|                Accommodated Upstream Minimum Bandwidth        |
+-+-+-+-+-+-+-+-+-+-+-+-+-+-+-+-+-+-+-+-+-+-+-+-+-+-+-+-+-+-+-+-+
|               Accommodated Downstream Minimum Bandwidth       |
+-+-+-+-+-+-+-+-+-+-+-+-+-+-+-+-+-+-+-+-+-+-+-+-+-+-+-+-+-+-+-+-+
|                Accommodated Upstream Maximum Bandwidth        |
+-+-+-+-+-+-+-+-+-+-+-+-+-+-+-+-+-+-+-+-+-+-+-+-+-+-+-+-+-+-+-+-+
|               Accommodated Downstream Maximum Bandwidth       |
+-+-+-+-+-+-+-+-+-+-+-+-+-+-+-+-+-+-+-+-+-+-+-+-+-+-+-+-+-+-+-+-+
```

FIGURE 3

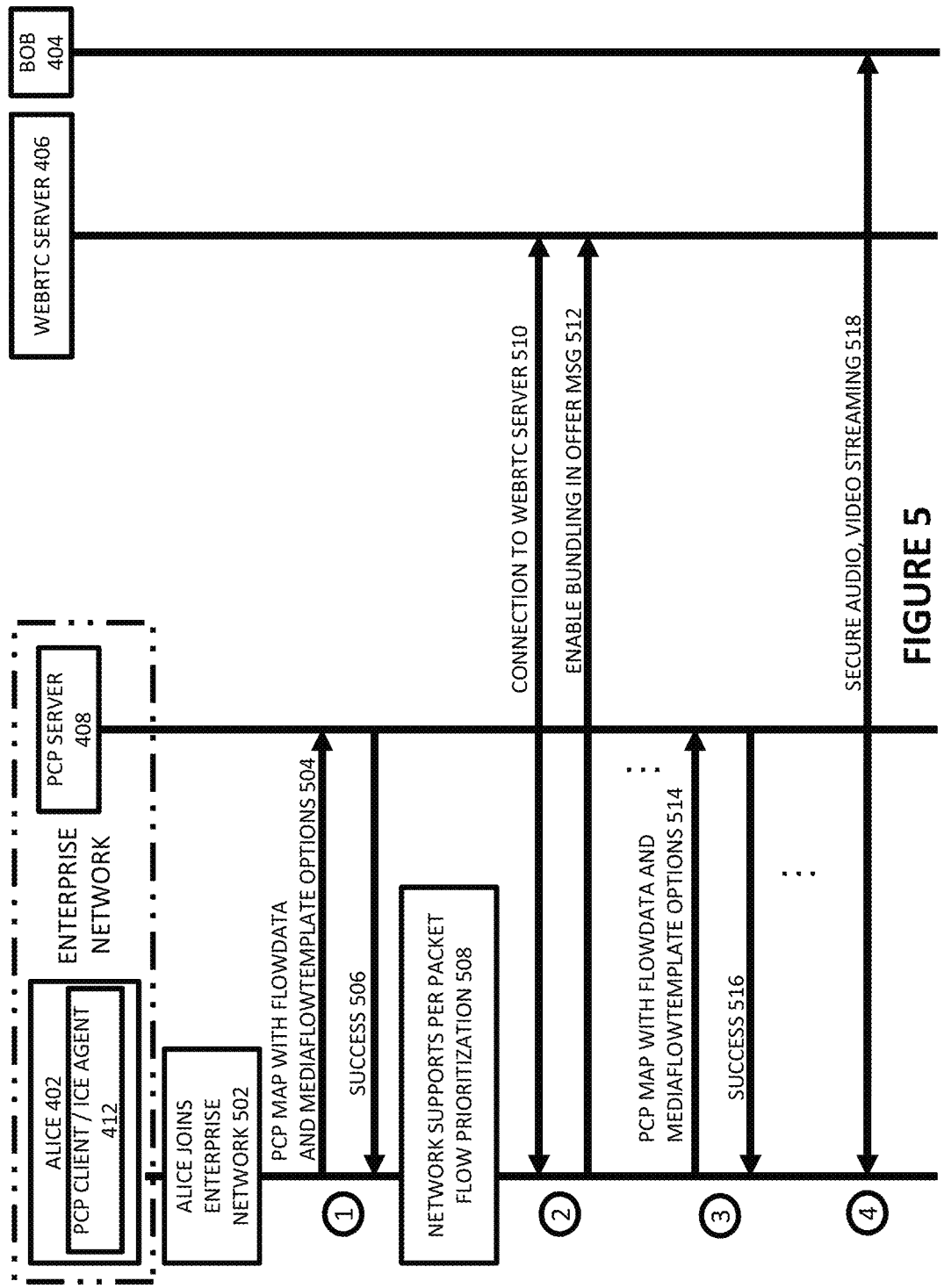

SMARTER POLICY DECISIONS BASED ON METADATA IN DATA FLOWS

CROSS-REFERENCE TO RELATED APPLICATIONS

This application is a continuation of U.S. patent application Ser. No. 14/194,348 filed on Feb. 28, 2014, the contents of which is incorporated herein by reference in its entirety.

TECHNICAL FIELD OF THE DISCLOSURE

The present disclosure relates generally to communications and, more particularly, to the policy-based management of media streams and data streams within a (data) flow.

BACKGROUND

Present day communications occur more often over the Internet or other types of data networks, and less and less often on "landlines." Many users have migrated and embraced Internet enabled technologies where devices can establish session or a connection with each other to stream media content. These types of communication applications provide a myriad of opportunities for users to engage and interact with each other and promote collaboration among users located remotely from each other. Exemplary technologies include WebRTC (stands for Web Real-Time Communication), WebEx, Jabber, and so forth. These technologies have been developed to facilitate endpoints (e.g., user devices such as computers, mobile devices, etc.) to establish a session or a connection with each other through signaling and subsequent transmission of media streams and data streams having different types of media content in a peer-to-peer session, or in a conference with multiple (or more than two) parties.

In the example of WebRTC, Real-time Transport Protocol (RTP) is leveraged to allow audio, video, and any other data for real-time media/communication applications to be transported reliably from one endpoint to another. WebRTC provides building blocks to support direct, interactive, real-time communication using audio, video, collaboration, games, data files sharing and transfer, etc., between two peers' web-browsers. As more users utilize the network to stream media content between each other, the need to find better ways to manage these media streams and data streams within these sessions also grows.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIG. 2 shows an exemplary format of a PCP option request;

FIG. 3 shows an exemplary format of a PCP option response;

FIG. 5 shows an illustrative messaging diagram corresponding to FIG. 4, according to some embodiments of the disclosure;

DETAILED DESCRIPTION OF EXAMPLE EMBODIMENTS

Overview

Figure 1:
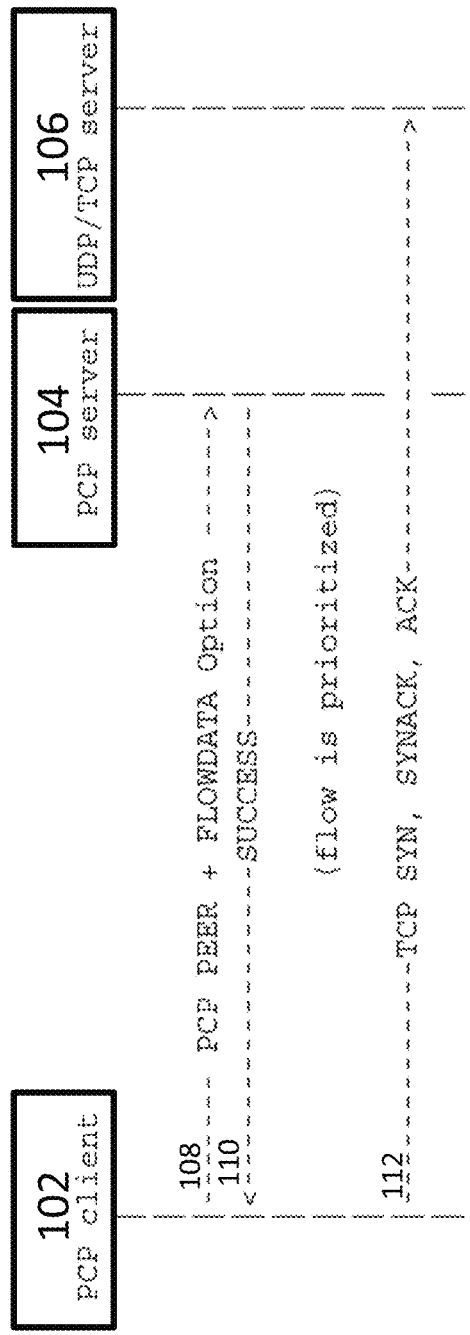
FIG. 1 is an exemplary messaging diagram illustrating a PCP client requesting a PCP server to prioritize a flow and establishing the flow.

A first example includes a method for providing feedback from a Port Control Protocol (PCP) server to a PCP client of a first device for enabling a network to enforce one or more traffic handling policies. The method comprises receiving, at the PCP server from the PCP client of the first device, a query whether the PCP client can bundle a plurality of streams into a flow, determining, by the PCP server using a policy application, whether the PCP client is allowed to bundle the plurality of streams into the flow and the network is configured to classify traffic on a per-packet basis, and in response to determining the PCP client is allowed to bundle the plurality of streams into the flow and the network is configured to classify traffic on a per-packet basis, transmitting, from the PCP server to the PCP client, a response to the query indicating to the PCP client that bundling is allowed or not.

A second example includes a method for receiving feedback from a Port Control Protocol (PCP) server at a PCP client of a first device for enabling a network to enforce one or more traffic handling policies. The method comprises transmitting, from the PCP client to the PCP server, a query whether the PCP client can bundle a plurality of streams into a flow; receiving, from the PCP server at the PCP client, a response to the query indicating to the PCP client that bundling is allowed and the network is configured to classify traffic on a per-packet basis, transmitting a PCP request comprising a PCP option having one or more of the following: a first identifier for identifying packets associated with a first stream of the plurality of streams and one or more quality of service characteristics associated with the first stream, and a second identifier for identifying packets associated with a second stream of the plurality of streams and one or more quality of service characteristics associated with the second stream.

The first example and the second example illustrate a method that advantageously allows the PCP server to signal to the PCP client whether the network can enforce differentiated quality of service characteristics on a per-packet basis for the different streams within a flow, and thereby influencing whether streams should be bundled or not.

Similar advantages are achieved through a PCP server, a first device, and logic encoded in one or more non-transitory media.

A third example includes a method for providing feedback from a Port Control Protocol (PCP) server to a PCP client of a first device to enforce one or more security policies in a network. The method comprises receiving, from the PCP client at the PCP server, a query whether the PCP client can bundle a plurality of streams into a flow, determining, by the PCP server using a policy application, whether at least one of the plurality of streams is to be provided to a security application through a relay element, and in response to determining the PCP client must transmit at least one of the plurality of streams separately from the rest of the plurality of streams, transmitting, from the PCP server to the PCP client, a response indicating to the PCP client that the at least one of the plurality of streams is to be provided to the security application through a relay element.

A fourth example includes a method for receiving feedback from a Port Control Protocol (PCP) server at a PCP client of a first device to enforce one or more security policies in a network. The method comprises transmitting, from the PCP client to the PCP server, a query whether the PCP client can bundle a plurality of streams into a flow, receiving, from the PCP server at the PCP client, a response indicating to the PCP client that the at least one of the plurality of streams is to be provided to the relay element and the security application, determining, by an connection agent at first device, an address for the relay element, and signaling, by the connection agent at the first device, to the relay element to obtain the relay element for transmitting the at least one of the plurality of streams to a second device via the relay element.

The third example and the fourth example illustrate a method that advantageously allows the PCP server to signal to the PCP client that one or more security policies is to be enforced in the network wherein a particular stream cannot be bundled with the rest of the streams. The signaling can influence the PCP client (or the first device itself) to transmit that particular stream via a security application for deep packet inspection in accordance with the one or more security policies. Similar advantages are achieved through a PCP server, a first device, and logic encoded in one or more non-transitory media.

Example Embodiments

Allowing Applications to Signal Flow Characteristics using PCP FLOWDATA Option

Modern day user applications leverages new communication technologies such as WebRTC, WebEx, and Jabber allow devices to connect and exchange media content including audio streams, video streams, and data streams/channels (all included within the term "streams" in this present disclosure). Audio streams carry (real-time) audio content, video streams carry (real-time) video content, and data streams/channels can carry generic data, text, messages, data structures, data files, or some other data in a particular format suitable for transport over a network. One endpoint can connect to a server, e.g., a cloud based server, to establish a session or a connection with another endpoint for transporting such media content in one or more flows. The present disclosure utilizes the words "connection" and "session" interchangeably, as meaning the communication link(s) established between endpoints in which one or more flows is carried for purposes of exchanging media content in providing a particular communication application for a user.

Mechanisms for managing the exchange of media streams and data streams in these flows over a network have been limited. Specifically, the network lacked proper mechanisms to influence how these applications should transport the data streams/channels and the media streams in these flows. Some mechanisms are available for allowing an endpoint to signal to the network how a particular flow should be handled by the network. For instance, to better manage flows, a proposal for "PCP FLOWDATA Option" leveraging Port Control Protocol (PCP) has been proposed in the PCP Working Group ("draft-wing-pcp-flowdata-00"), which describes a mechanism for a host (e.g., a PCP client,) to signal flow characteristics to the network (e.g., a PCP server), and the network (e.g., a PCP server) to signal its ability or inability to accommodate that flow back to the host (e.g., a PCP client).

Access networks often have insufficient bandwidth or other characteristics that prevent some applications from functioning as well as desired. Although the quality of wireless and wired access networks continue to improve, those access networks are often constrained for various reasons. PCP FLOWDATA Option provides a mechanism to signal a communication application's network requirements to the access network, so that certain network flows can receive service that is differentiated from other network flows. Within the context of his disclosure and the PCP FLOWDATA Option document, a flow is identified by a 5-tuple comprising source Internet Protocol (IP) address, destination IP address, protocol, source port number, and destination port number. With this mechanism, a host can request the network provide certain characteristics for a flow in both the upstream and downstream directions. The network authorizes the request and signals back to the host that it can (fully or partially) accommodate the flow. This sort of signaling is useful for long-lived flows such as interactive audio/video, streaming video, and network control traffic (call signaling, routing protocols).

To illustrate the mechanism of PCP FLOWDATA Option, FIG. 1 is an exemplary messaging diagram showing a PCP client requesting a PCP server to prioritize a flow and establishing the flow. A PCP client may want to indicate to the network, e.g., via a PCP server, the priority of a flow after the flow has been established or before the flow has been established. In this FIGURE, the messaging diagram shows the latter example where a PCP client 102 transmits a PCP PEER+FLOWDATA Option request to the PCP server 104 (arrow 108). An example of such request is illustrated in FIG. 2. This exemplary request (arrow 108) having the FLOWDATA Option may include an identifier for identifying the flow, and flow characteristics for the flow desired. Subsequently, the PCP server 104 transmits to the PCP client 102, a PCP response (arrow 110). An example of such response is illustrated in FIG. 3. This exemplary response (arrow 110) may include a code indicating success, and/or that the network is able to guarantee the flow characteristics for the flow as requested (or some other flow characteristics that the network is able to guarantee). Upon receiving the response indicating success, the PCP client establishes a session or a connection with User Datagram Protocol (UDP)/Transport Control Protocol (TCP) server via a three-way handshake comprising a TCP SYN, SYNACK, and ACK (arrow 112).

When processing requests from PCP client 102, the PCP server 104 determines if the flow characteristics described in the FLOWDATA option can be accommodated by the network element controlled by the PCP server (that is, the router, NAT, or firewall controlled by the PCP server), in some cases, the network itself or more than one network elements. To determine this, the PCP server might examine its static configuration and do bandwidth counting, or it might reconfigure the underlying network so that additional bandwidth is made available for this particular flow, or might perform other actions. If the PCP server determines the flow can only be partially accommodated, it returns values in the FLOWDATA fields that it can accommodate (e.g., comprising a "SUCCESS" code) or returns 0 in those FLOWDATA fields where it has no information. In other words if the request indicated a low tolerance for delay but the PCP server and its controlled device determine that only high delay is available, the FLOWDATA response indicates high delay is available. The same sort of processing occurs on all of the FLOWDATA fields of the response (upstream and downstream delay tolerance, loss tolerance, jitter tolerance, minimum bandwidth, and maximum bandwidth). If the PCP response was SUCCESS (0), the PCP server has created a mapping and flow is prioritized. If the PCP response contains the FLOWDATA option, the FLOWDATA fields indicate if the network could accommodate the requested flow characteristics. The PCP client can use that information to influence the traffic it sends and receives on the network.

FIG. 2 shows an exemplary format of a PCP option request. The request may include one or more of the following for signaling flow characteristics from a PCP client to a PCP server:

- an identifier for identifying a flow, and various flow characteristics for that flow. Instance Identifier: 96 bit identifier, unique to each simultaneously-active flow. This can be a pseudo random number
- uDT: Upstream Delay Tolerance, 0=no information available, 1=very low, 2=low, 3=medium, 4=high.
- uLT: Upstream Loss Tolerance, 0=no information available, 1=very low, 2=low, 3=medium, 4=high.
- uJT: Upstream Jitter Tolerance, 0=no information available, 1=very low, 2=low, 3=medium, 4=high.
- RSVD1: Reserved (7 bits), may be ignored on reception and may be 0 on transmission.
- dDT: Downstream Delay Tolerance, 0=no information available, 1=very low, 2=low, 3=medium, 4=high.
- dLT: Downstream Loss Tolerance, 0=no information available, 1=very low, 2=low, 3=medium, 4=high.
- dJT: Downstream Jitter Tolerance, 0=no information available, 1=very low, 2=low, 3=medium, 4=high.
- RSVD2: Reserved (7 bits), may be ignored on reception and may be 0 on transmission.
- Upstream Minimum Bandwidth Measures bandwidth sent by the PCP client. Value is in octets per second. The value 0 means no information is available.
- Downstream Minimum Bandwidth Measures bandwidth sent to the PCP client. Value is in octets per second. The value 0 means no information is available.
- Upstream Maximum Bandwidth: Measures bandwidth sent by the PCP client. Value is in octets per second. The value 0 means no information is available.
- Downstream Maximum Bandwidth Measures bandwidth sent to the PCP client. Value is in octets per second. The value 0 means no information is available.

FIG. 3 shows an exemplary format of a PCP option response. The fields of the response indicate that the network element or the network can accommodate the flow according to the set of flow characteristics returned in the response. The description of these fields corresponds to the description of the fields in the Option request shown in FIG. 2.

Limitations of PCP FLOWDATA Option

While PCP FLOWDATA Option can be used for signaling to a PCP server how to handle a particular flow, some limitations exists for managing how the data channels/streams and media streams (generally referred to as "streams") within the flow. For instance, the PCP server and PCP clients using PCP FLOWDATA Option can only adjust bandwidth decisions based on whether the network can accommodate its bandwidth. The network is not capable of using simply PCP FLOWDATA Option if the network has other policies, which may influence how data and media streams within a flow are to be transported. The policies may include Quality of Service (QoS) policies/capabilities enforceable on these streams, security policies applicable to certain streams (e.g., data streams/channels), etc.

In one exemplary problem, Web Real-Time Communication (WebRTC) (IETF Network Working Group "draft-ietf-rtcweb-rtp-usage-06" in section 4.4) suggests to put interactive audio and interactive video over the same 5-tuple {source Internet Protocol (IP) address, destination IP address, protocol, source port number, and destination port number}. Without special handling, the same QoS treatment will be applied to the audio and video streams in the 5-tuple. If the network has the capability to classify traffic in the flow on a per-packet basis to apply differentiated QoS characteristics on different streams (e.g., audio stream, video stream, data channel/stream, etc.), PCP FLOWDATA Option does not provide a mechanism for the PCP server to provide such feedback information to the PCP client.

In another exemplary problem, WebRTC endpoints can exchange generic data, such as data files, text, messages, data structures, and other suitable content over a data stream or data channel. The data stream/channel is typically being established for non-real-time-streaming media data types, for example data files, once an Interactive Connectivity Establishment (ICE) agent determines connectivity check is successful. In the WebRTC context SCTP-over-DTLS-over-UDP (SCTP stands for "Stream Control Transmission Protocol", DTLS stands for "Datagram Transport Layer Security", and UDP stands for "User Datagram Protocol" channel is going to be used for file transfers (as described in IETF Network Working Group "draft-ietf-rtcweb-data-channel-05"). If the network has a security policy to scan the files in the data channel, PCP FLOWDATA Option does not provide a way for the PCP server to provide such feedback information to the PCP client to force the PCP client (or some other application on the device) not to multiplex data channels with media streams so that data channels can take a different path (e.g., go through a Cloud based "Security As A Service" for inspection).

Extension or Replacement to PCP FLOWDATA Option: PCP MEDIAFLOWTEMPLATE Option

The present disclosure describes mechanisms for a Port Control Protocol (PCP) server to provide feedback to PCP clients to enforce certain policies on the transport of such media content for a network. In particular, the mechanisms extend the PCP FLOWDATA Option by describing an extended protocol, referred herein as "PCP MEDIAFLOWDATATEMPLATE Option" (it is appreciated by one skilled in the art that other names may be used for new option). A policy may include a traffic handling policy for enforcing differentiated quality of service (QoS) characteristics for different types of media streams (e.g., if capabilities of the network allow). For instance, a PCP client asks the network if it is permitted to bundle various media streams onto the same 5-tuple. The network may apply the policy and respond indicating whether such bundling is permitted or not permitted. This network decision would be based on the network's ability to provide QoS on a per-packet basis. Another policy may include a security policy ensuring a data files being transmitted over a data channel from one endpoint travels to a security application via a relay element before the packets reaches another endpoint. The mechanisms are transparent to the endpoints, and advantageously preserve the user experience for these user applications.

The PCP MEDIAFLOWTEMPLATE Option may include requests and responses according to a particular format. The format is similar to PCP FLOWDATA Option request and response as shown in FIGS. 2 and 3. However, the format of PCP MEDIAFLOWTEMPLATE Option differs from the PCP FLOWDATA Option in several aspects.

In one aspect, PCP MEDIAFLOWTEMPLATE Option request and response may include a field indicating a query by the PCP client requesting whether bundling is allowed for a set of identified streams within a flow (streams including data stream(s) and/or media stream(s)). Conversely, PCP MEDIAFLOWTEMPLATE Option request and response may include a field indicating whether bundling is allowed for a set of identified streams within a flow (and the network is capable of classifying traffic on a per-packet basis) or not allowed for the set of identified streams within the flow (and the network is not capable of classifying traffic on a per-packet basis).

In another aspect, PCP MEDIAFLOWTEMPLATE Option request and response may include one or more fields comprising stream identifier(s) to allow a PCP Client and a PCP Server to identify certain streams bundled/multiplexed within a flow and specify corresponding Quality of Service (QoS) characteristics for particular identified streams (e.g., corresponding upstream and downstream delay tolerance, loss tolerance, jitter tolerance, minimum bandwidth, maximum bandwidth, etc.). The stream identifiers may include Layer 7 packet identifiers for distinguishing different types of media streams (e.g., audio data stream, video data stream, etc.) This field is particularly useful for bundling real-time media streams and specifying QoS characteristics for those streams.

In yet another aspect, PCP MEDIAFLOWTEMPLATE Option response may include one or more fields comprising stream identifier(s) for identifying which stream (e.g., a data stream/channel) cannot be bundled/multiplexed with other streams (e.g., audio stream, and video stream, or any other (real-time) media stream) (and that the identified stream must traverse a security application via a relay element).

As one skilled in the art would appreciate, the PCP MEDIAFLOW TEMPLATE Option protocol may be used to replace or supplement PCP FLOWDATA Option, depending on the implementation.

Traffic Handling Policies on a Per-Packet Basis

If the network (e.g., the network element managed by the PCP server) is capable of classifying traffic (e.g., distinguishing packets from one stream from packets from another media stream) and applying differentiated QoS characteristics for the classified traffic, PCP MEDIAFLOWTEMPLATE Option can be used as a mechanism for the PCP server to signal to the PCP client that bundling is allowed and the streams (e.g., audio stream, video stream) within the flow can have differentiated QoS characteristics. The overall mechanism can be outlined by the following:

1. When first joining a network, the host may determine if the network supports PCP Flow Extensions. This may be performed following the procedure described in IETF PCP Working Group "draft-wing-pcp-flowdata-00"), where basically a PCP Flow Extension probe packet is sent, which provides coarse information on the link capabilities. After confirming that PCP Flow Extensions are supported on that network interface, the ICE agent can use PCP Flow Extensions on that interface.
2. PCP client queries the PCP server to find if it can bundle various (media) streams onto the same 5-tuple.
3. The PCP server based on its capability to classify the traffic on per packet or 5-tuple basis responds to the client to enable or disable bundling.
4. If PCP server responds not to bundle various (media) streams then ICE agent will disable Bundling in session setup message. ICE agent will use PCP to convey the flow characteristics in FLOWDATA option with PCP MAP/PEER request.
5. If PCP server responds to bundle various (media) streams then ICE agent will enable Bundling in session setup message. PCP client would convey the flow characteristics in FLOWDATA option with PCP MAP/PEER request and L7 details like RTP SSRC or RTP Payload types in a new PCP option (e.g., PCP MEDIAFLOWTEM PLATE Option) so that the network can enforce QOS on a per-packet basis.

Figure 4:
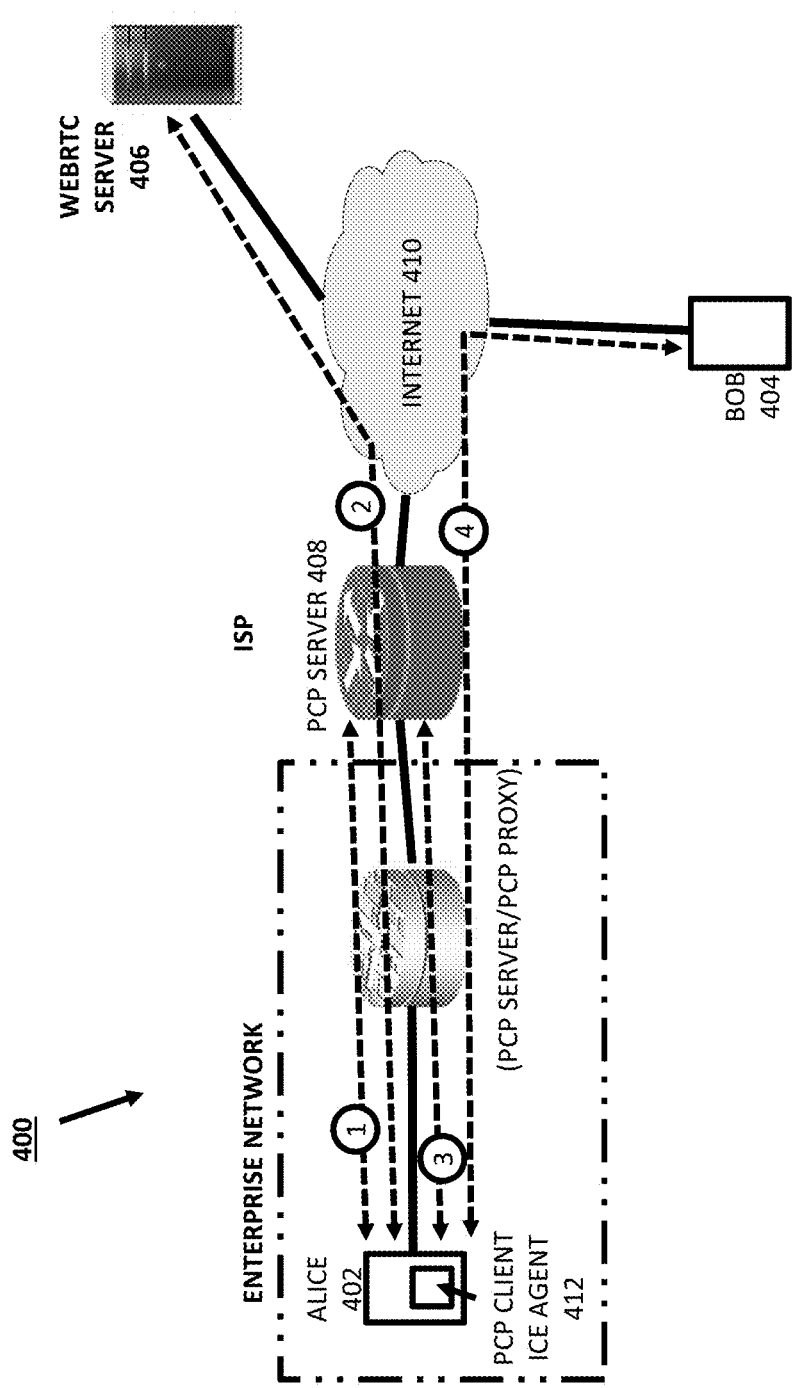
FIG. 4 shows an illustrative system for enabling a network to enforce one or more traffic handling policies, according to some embodiments of the disclosure.

FIG. 4 shows an illustrative system for enabling a network to enforce one or more traffic handling policies, according to some embodiments of the disclosure. FIG. 5 shows an illustrative messaging diagram corresponding to FIG. 4, according to some embodiments of the disclosure. Note the circled numbers 1, 2, 3, and 4 labeling various arrows of FIG. 4 indicating flows of information roughly correspond to the messages labeled with the same circled numbers in FIG. 5 to make for easier understanding of the two FIGURES. Mechanisms for providing feedback from a Port Control Protocol (PCP) server to a PCP client of a first device (e.g., Alice) for enabling a network to enforce one or more traffic handling policies are illustrated in FIGS. 4 and 5.

The overall system 400 may include Alice 402, Bob 404, WebRTC server 406, and PCP Server 408. Alice and an optional PCP Server/PCP Proxy may be provided within an enterprise network, and the WebRTC server and Bob are reachable via the Internet 410. Alice has a PCP client and/or an ICE agent 412 implemented thereon. It is appreciated that Alice and Bob are meant to illustrate a device or a user device having a communication application implemented thereon, and the devices serve as endpoints of an end-to-end communication connection/session to be established between Alice and Bob. Example devices include mobile user devices, computers, and any suitable device having logic for implementing a communication application, a PCP client, and/or ICE agent. Typically, the PCP servers and proxy as shown are configured to manage a network having one or more network elements where flow characteristics can be accommodated/managed for traffic traveling between endpoints such as Alice and Bob.

Alice may first join the enterprise network (state 502). To prioritize a flow that Alice wishes to transmit over a connection with Bob, Alice may transmit, from the PCP client to the PCP server, a query whether the PCP client can bundle a plurality of streams into a flow (arrow 504). The plurality of streams can include at least one media stream and/or at least one data stream. The query may include a PCP (e.g., MAP) request with FLOWDATA Option (as described in FIG. 2) and MEDIAFLOWTEMPLATE Option. This request serves to query whether the PCP client should bundle streams into a single flow. From the perspective of the PCP server, the PCP server receives from the PCP client, a query whether the PCP client can bundle a plurality of streams into a flow (arrow 504).

The PCP server may determine, using a policy application, whether the PCP client is allowed to bundle the plurality of streams into the flow and the network is configured to classify traffic on a per-packet basis. In response to determining the PCP client is allowed to bundle the plurality of streams into the flow and the network is configured to classify traffic on a per-packet basis, the PCP server transmits to the PCP client, a response to the query indicating to the PCP client that bundling is allowed (arrow 506). For instance, a PCP Option response having a success code may be provided from the PCP server to the PCP client. From the perspective of the PCP client, the PCP client may receive, from the PCP server, a response to the query indicating to the PCP client that bundling is allowed and the network is configured to classify traffic on a per-packet basis (arrow 506).

In some cases, the PCP server, using the policy application, may determine whether the network is configured to classify traffic on a per-5-tuple basis and not on a per-packet basis. In response to determining the network is configured to classify traffic on a per-5-tuple basis and not on a per-packet basis, the PCP server may transmit, to the PCP client, a response to the query indicating to the PCP client that bundling is not allowed. The PCP client may then decouple the media streams and transmit them separately as multiple flows identified by different 5-tuples if differentiated QoS characteristics are to be accommodated for these streams.

Upon receiving the response, Alice is informed of the feedback from the PCP server that the network supports per-packet flow prioritization (state 508). Based on this information, Alice may establish a connection to a WebRTC server (arrow 510) to begin a session setup process for a connection to be established between Alice and Bob. Specifically, knowing the network can classify traffic on a per-packet basis, Alice may enable, using a connection agent, bundling of the plurality of streams (e.g., media streams) into the flow by signaling an application server (in this case the WebRTC server), with a session setup message, indicating that the plurality of streams are bundled in the flow (arrow 512). The plurality of streams may be bundled into the flow according to a 5-tuple, the 5-tuple comprising source Internet Protocol (IP) address, destination IP address, protocol, source port number, and destination port number.

To provide the PCP server further differentiated QoS characteristics for the streams (e.g., media streams), Alice may transmitting a PCP request (arrow 514) comprising a PCP option (e.g., as a PCP MAP with FLOWDATA and MEDIAFLOWTEMPLATE Options) having one or more of the following: a first identifier for identifying packets associated with a first stream of the plurality of streams and one or more quality of service characteristics associated with the first stream, and a second identifier for identifying packets associated with a second stream of the plurality of data streams and one or more quality of service characteristics associated with the second data stream. From the perspective of the PCP server, the PCP server receives such PCP request from the PCP client (arrow 514). The first identifier may include Layer 7 information usable for classifying whether a given packet belongs to the first stream, and the second identifier may include Layer 7 information usable for classifying whether a given packet belongs to the second stream. The first identifier and the second identifier each comprises one or more of the following: a differentiated service code point (DSCP) identifier, a synchronization source identifier (e.g., RTP SSRC), a payload type identifier (e.g., RTP Payload types). In response to determining the network can accommodate the QoS characteristics, the PCP server 408 may transmit a PCP response with a success code (arrow 516). These PCP exchanges may be repeated as streams are being added to the flow or removed from the flow, or when the application requires different QoS characteristics to be enforced on the various flows.

After being informed by the PCP server that bundling is allowed and the network is capable of per-packet basis classification of traffic for applying differentiated QoS characteristics, Alice may transmit the plurality of streams as part of the flow over the network Alice to Bob (securely) (arrow 518), wherein the flow is identified by a 5-tuple comprising source Internet Protocol (IP) address, destination IP address, protocol, source port number, and destination port number. In response to determining the PCP client is allowed to bundle the plurality of streams into the flow and the network is configured to classify traffic on a per-packet basis, the network may classify packets of the flow (of arrow 518) on a per-packet basis to enforce different quality of service characteristics provided by the PCP client (e.g., provided in the MEDIAFLOWTEMPLATE Option of arrow 514) on different ones of the plurality of streams.

Security Policies

If the network (e.g., the network element managed by the PCP server) has security policies for making sure content being provided between Alice and Bob are free from malicious content or do not include proprietary/secret information, PCP MEDIAFLOWTEMPLATE Option can be used as a mechanism for the PCP server to signal to the PCP client that bundling of a particular stream with other streams (e.g., bundling a data channel with other media streams, e.g., audio stream and video stream) is not allowed, and such particular stream (e.g., the data channel) must be sent to a security application via a relay element. It is noted that within the context of the disclosure, data channel (as a special case of a data stream) is a preferred candidate for disabling bundling since security applications are more interested in filtering traffic within such data channel which may include data files and so on. However, such selective bundling mechanism may also apply to other types of streams such as audio and video streams, if a security application is to inspect those media streams separately from the rest of the data streams. The step of inspecting the traffic of a selected stream (not bundled with the rest of the streams) might come at a cost of latency due to the path of the traffic being relayed by a relay element in order for the traffic to be scanned by the security application.

For inspecting traffic of a stream, Enterprise deployments using Cloud based "Security As A Service" (SecaaS) could play the role of Traversal Using Relays around NAT (TURN) server as a relay element allowing it to be able to perform deep packet inspection, heuristics, etc., on the traffic being transported over a selected stream (e.g., the data channel) to detect infected files, data leakage, malware in the traffic being transported in the selected stream. A host (e.g., Alice) may learn the TURN server address using existing mechanisms (for example configure the browsers used in the enterprise with network specific TURN servers as discussed in IETF RTCWEB Working Group "draft-ietf-rtcweb-use-cases-and-requirements #section-3.2.5").

The overall mechanism for enforcing security policies through PCP can be outlined by the following:

1. PCP controlled-Firewall (e.g., a special PCP server), which may be co-located with SecaaS Cloud Connector is aware of SecaaS capability to perform DPI on traffic (e.g., traffic being transported on data streams/channels).
2. PCP client queries the PCP server to find if it can bundle a plurality of streams (e.g., data streams/channels and media streams).
3. PCP controlled-Firewall (e.g., a special PCP server) will inform the PCP client not to multiplex a particular stream or streams (e.g., Data Channels) with the rest of the streams (e.g., media streams) and use relayed candidates for the particular stream or streams (e.g., Data Channels).
4. If PCP server responds not to bundle the plurality of streams (e.g., not to bundle data channels with media streams) and use relayed candidates for a particular stream or streams (e.g., data channels) then the ICE agent will advertise relayed candidate addresses for the particular stream/streams (e.g., data channels) in the session setup message. Thus, the network forces the traffic in the particular stream/streams (e.g., non-media data) to be exchanged through SecaaS. If the endpoint multiplexes the particular stream/streams (e.g., the data channel) in a way that violates the security policy its session will get terminated.

Figure 6A:
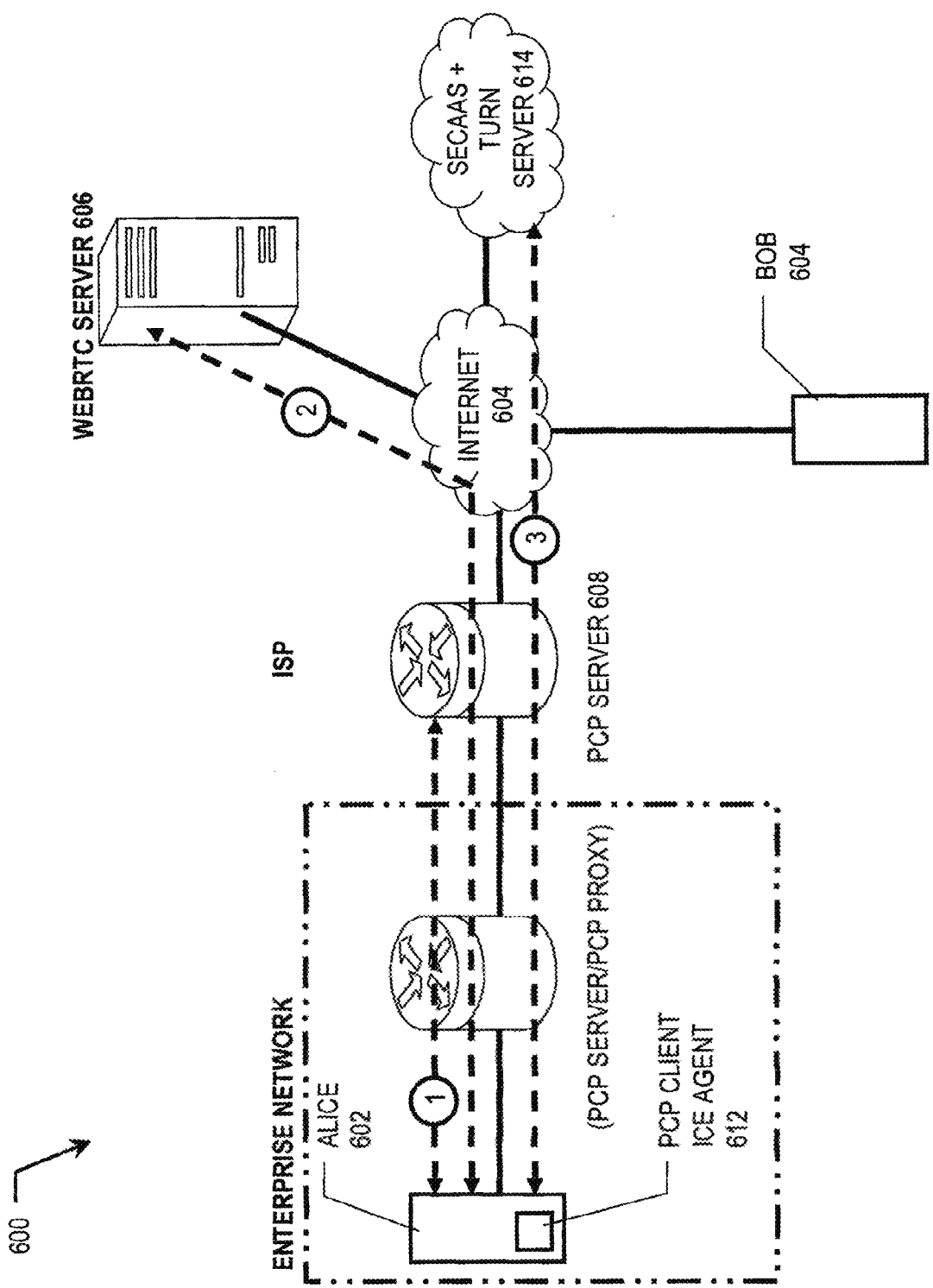
FIG. 6A-B show an illustrative system for providing feedback from a Port Control Protocol (PCP) server to a PCP client of a first device to enforce one or more security policies in a network, according to some embodiments of the disclosure.
Figure 6B:
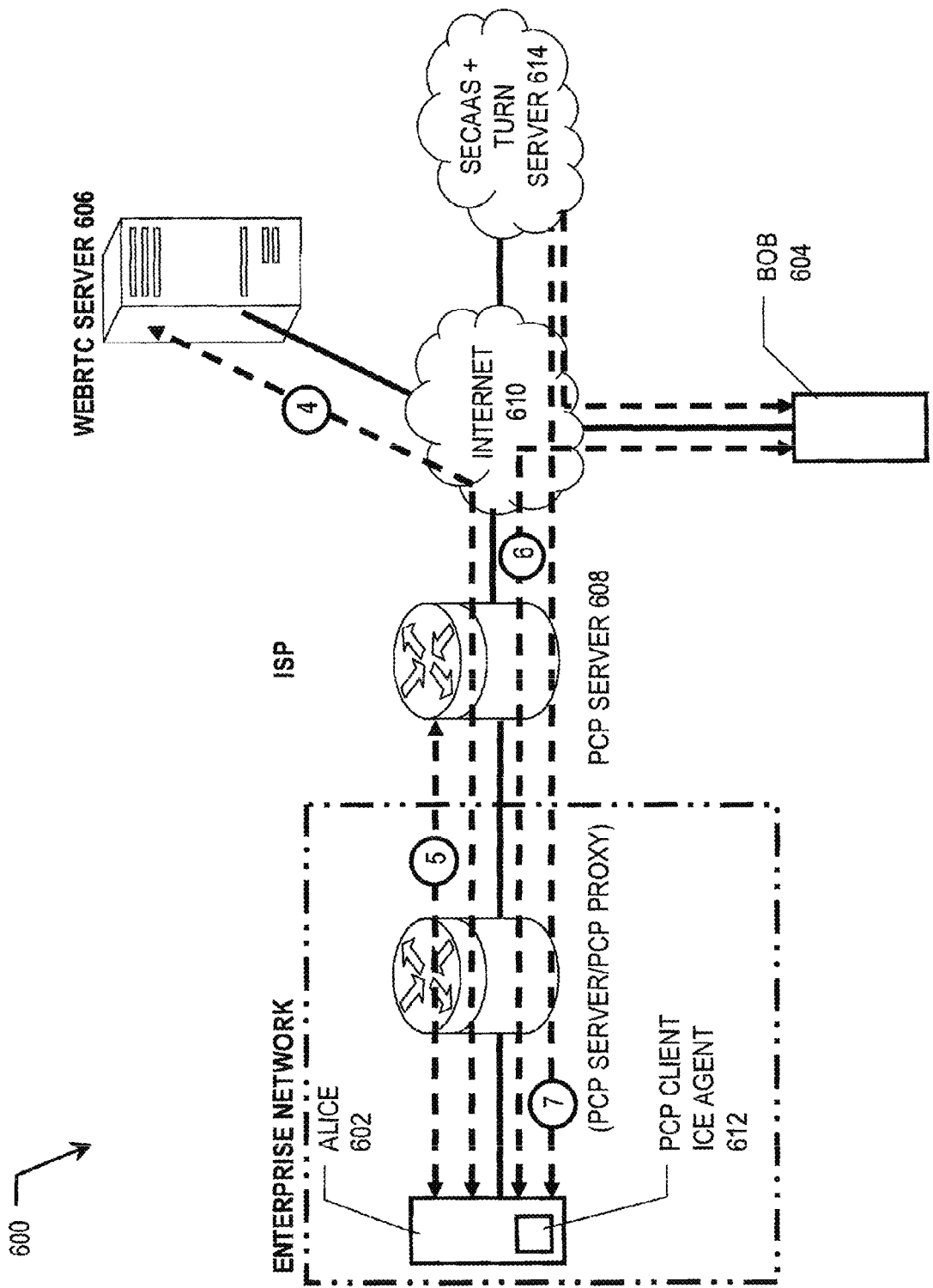
Figure 7A:
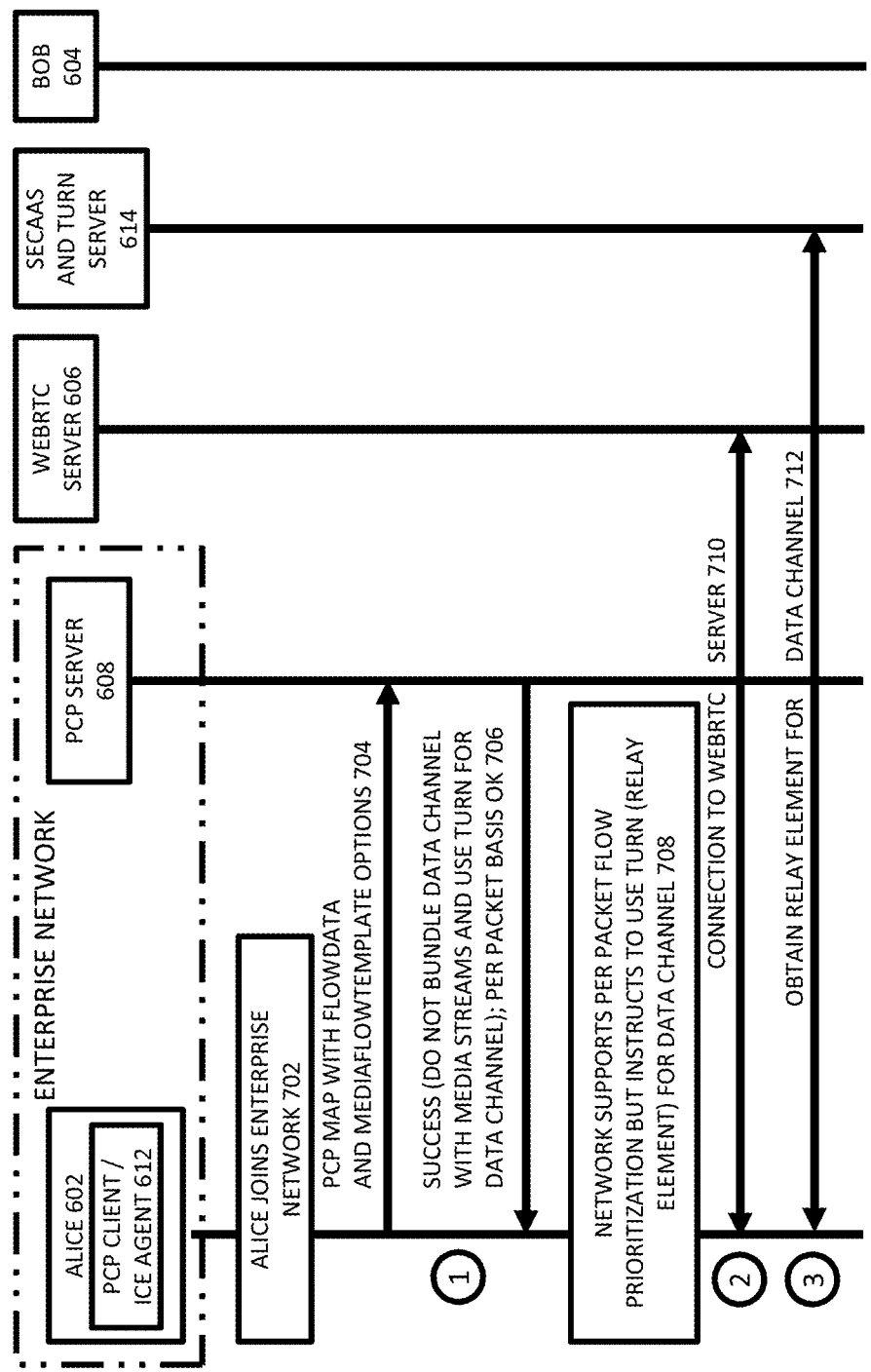
FIG. 7A-B show an illustrative messaging diagram corresponding to FIG. 6A-B, respectively, according to some embodiments of the disclosure.
Figure 7B:
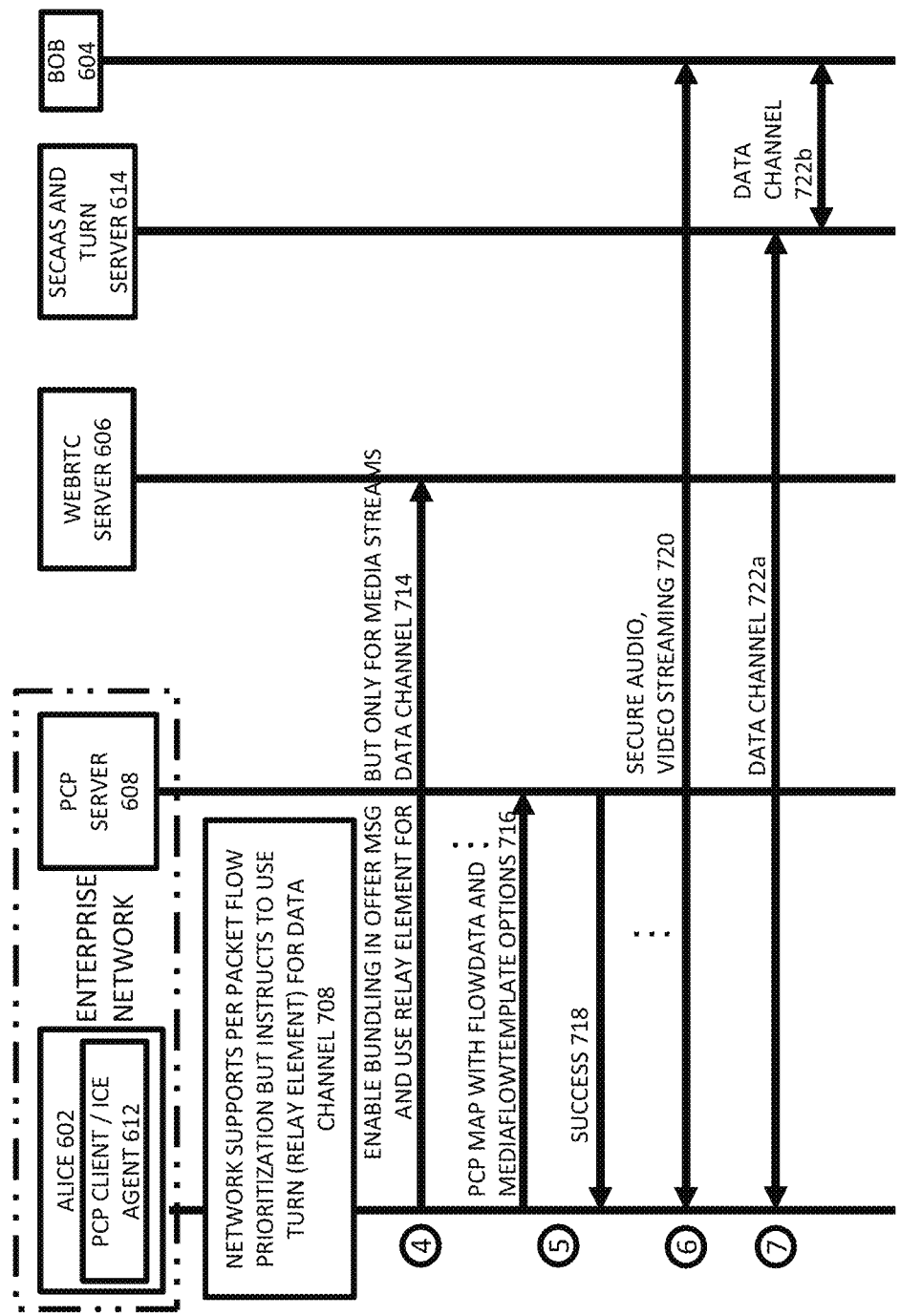

FIG. 6A-B show an illustrative system for providing feedback from a Port Control Protocol (PCP) server to a PCP client of a first device to enforce one or more security policies in a network, according to some embodiments of the disclosure. FIG. 7A-B show an illustrative messaging diagram corresponding to FIG. 6A-B, respectively, according to some embodiments of the disclosure. Note the circled numbers 1, 2, 3, 4, 5, 6, and 7 labeling various arrows of FIG. 6A-B indicating flows of information roughly correspond to the messages labeled with the same circled numbers in FIG. 7A-B to make for easier understanding of the four FIGURES. Mechanisms for providing feedback from a Port Control Protocol (PCP) server to a PCP client of a first device (e.g., Alice) for enabling a network to enforce one or more security policies are illustrated in FIGS. 6A-B and 7A-B.

The overall system 600 may include Alice 602, Bob 604, WebRTC server 606, and PCP Server 608. Alice and an optional PCP Server/PCP Proxy may be provided within an enterprise network, and the WebRTC server and Bob are reachable via the Internet 610. Alice has a PCP client and/or an ICE agent 612 implemented thereon. The system 600 further includes a security application connectable via a relay element SecaaS+TURN server 614. It is appreciated that Alice and Bob are meant to illustrate a device or a user device having a communication application implemented thereon, and the devices serve as endpoints of an end-to-end communication connection/session to be established between Alice and Bob. Example devices include mobile user devices, computers, and any suitable device for providing logic for implementing a communication application, a PCP client, and/or ICE agent. Typically, the PCP servers and proxy as shown are configured to manage a network having one or more network elements where flow characteristics can be accommodated/managed for traffic traveling between endpoints such as Alice and Bob.

Alice joins enterprise network 702, and transmits, from the PCP client to the PCP server, a query whether the PCP client can bundle a plurality of streams into a flow (arrow 704). The plurality of streams may include one or more data streams and/or one or more media streams. For instance, Alice may transmit a PCP MAP request with FLOWDATA Option and MEDIAFLOWTEMPLATE Option to ask the PCP server whether bundling is allowed. From the perspective of the PCP server, the PCP server receives, from the PCP client, a query whether the PCP client can bundle a plurality of streams into a flow (arrow 704).

The PCP server determines, using a policy application, whether at least one of the plurality of streams (e.g., a data stream/channel) is to be provided to a security application through a relay element. In response to determining the PCP client must transmit at least one of the plurality of streams separately from the rest of the plurality of streams, transmitting, from the PCP server to the PCP client, a response indicating to the PCP client that the at least one of the plurality of streams is to be provided to the security application through a relay element (arrow 706). From the perspective of the PCP client, the PCP client receives, from the PCP server, a response indicating to the PCP client that the at least one of the plurality of streams is to be provided to the relay element and the security application (arrow 706). Effectively, the PCP server provides an appropriate PCP Option response indicating that the at least one of the plurality of streams (e.g., data channel/stream should not be bundled with the rest of the plurality of streams (e.g., media stream(s)) and use TURN for relaying the at least one of the plurality of streams (e.g., a data channel). Alice is then informed by the PCP server that the network supports per-packet flow prioritization but instructs to use a TURN server (e.g., as a relay element or relay candidate) for the data channel (state 708).

The connection agent of Alice establishes a connection to WebRTC server (arrow 710) and enables transmission of the at least one of the plurality of streams (e.g., a data channel) via the relay element by signaling the application server (in this case the WebRTC server), with a session setup message indicating the address of the relay element as a relay candidate for the at least one of the plurality of streams (e.g., a data channel).

Furthermore, the connection agent at Alice determines an address for the relay element, and signals to the relay element to obtain the relay element (as a relay candidate) for transmitting the at least one of the plurality of streams to a second device via the relay element (arrow 712).

The PCP server may, in addition to enforcing a security policy, also enforce traffic handling policies where the PCP server informs the PCP client that the network is capable of handling traffic on a per-packet basis (arrow 706). In such a scenario, the PCP server determines using the policy application whether the PCP client is allowed to bundle the rest of the plurality of streams into the flow and the network is configured to classify traffic on a per-packet basis. In response to determining the PCP client is allowed to bundle the rest of the plurality of streams into the flow and the network is configured to classify traffic on a per-packet basis, the PCP server transmits to the PCP client, a response to the query indicating to the PCP client that bundling for the rest of the plurality of streams is allowed (arrow 714). The rest of the streams can be a plurality of media streams.

The connection agent may enable, bundling of the rest of the plurality of streams into the flow by signaling an application server, with a session setup message, indicating that the rest of the plurality of streams are bundled in the flow (arrow 714). In this scenario, the PCP client/ICE agent at Alice may transmit a PCP request comprising a PCP option having one or more of the following: a first identifier for identifying packets associated with a first stream of the rest of the plurality of streams and one or more quality of service characteristics associated with the first stream; and a second identifier for identifying packets associated with a second stream of the rest of the plurality of streams and one or more quality of service characteristics associated with the second data stream (arrow 716). From the perspective of the PCP server, the PCP server receives said PCP request (arrow 716). Upon determining those QoS characteristics can be accommodated for these bundled streams, the PCP server 608 may transmit a PCP Option response having a success code (arrow 718). In response, Alice may transmit the rest of the plurality of streams as part of the flow over the network from the first device to a second device, wherein the flow is identified by a 5-tuple comprising source Internet Protocol (IP) address, destination IP address, protocol, source port number, and destination port number (arrow 720).

Furthermore, Alice transmits the at least one of plurality of streams (e.g., the data channel) to the second device via the relay element and separately from the rest of the plurality of streams (arrows 722a-b) (e.g., media streams). Generally, the at least one of the plurality of streams comprises data file(s) being transmitted from the first client towards a second client. Through this mechanism, the security application can perform deep packet inspection on packets in at least one of the plurality of data streams sent via the relay element to detect malicious content and/or proprietary content.

System Illustrations

Figure 8:
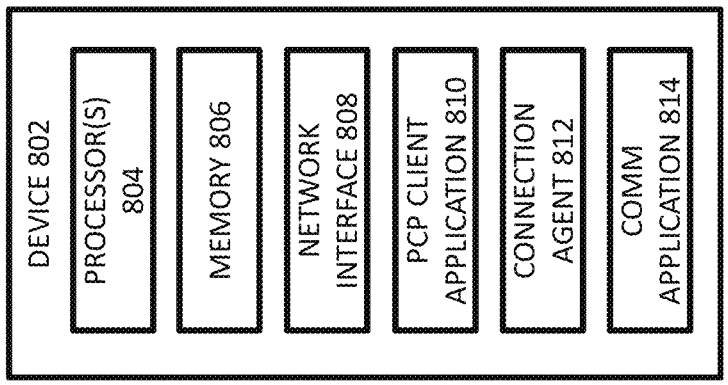
FIG. 8 shows an exemplary device comprising a PCP client and connection agent, according to some embodiments of the disclosure.

FIG. 8 shows an exemplary device comprising a PCP client and connection agent, according to some embodiments of the disclosure. Device 802 (e.g., referred to previously as Alice and Bob) may include one or more processors 804, one or more memory elements 806, a network interface 808 for communicating with other entities/devices over a network, a PCP client application 810 configured to provide functions of the PCP client described herein, a connection agent 812 configured to provide functions of the ICE connection agent described herein, and a communication application 814 allowing the user to consume media content transported using the protocols described herein.

Figure 9:
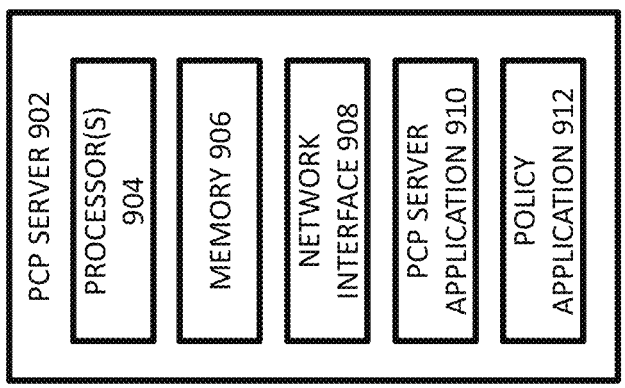
FIG. 9 shows an exemplary PCP server comprising a PCP server application and a policy application, according to some embodiments of the disclosure.

FIG. 9 shows an exemplary PCP server comprising a PCP server application and a policy application, according to some embodiments of the disclosure. PCP server 902 may include one or more processors 904, one or more memory elements 906, a network interface 908 for communicating with other entities/devices over a network, a PCP server application 908 configured to provide functions of a PCP server described herein, a policy application 912 for providing functions of enforcing one or more policies or enabling the one or more policies to be enforced in a network.

Figure 10:
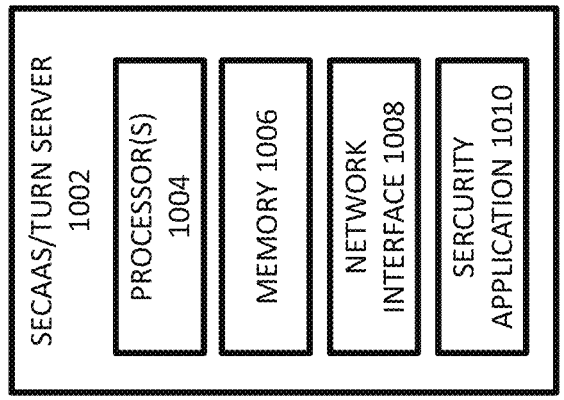
FIG. 10 shows an exemplary Security as a Service (SecaaS)/TURN server, according to some embodiments of the disclosure.

FIG. 10 shows an exemplary SecaaS/TURN server, according to some embodiments of the disclosure. The exemplary SecaaS/TURN server may include one or more processors 1004, one or more memory elements 1006, a network interface 1008 for communicating with other entities/devices over a network, and a security application 1010 for providing functions of inspecting traffic in a data stream (or in the special case, in a data channel).

Variations, Implementation, and Applications

Within the context of the disclosure, a network used herein represents a series of points or nodes of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber-to-the-x (FTTx), which is a generic term for any broadband network architecture that uses optical fiber in last-mile architectures, and data over cable service interface specification (DOCSIS) cable television (CATV). The architecture can also operate in junction with any 3G/4G/LTE cellular wireless and WiFi/WiMAX environments. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers, end user devices, routers, switches, cable boxes, gateways, relay elements, session border controllers, media gateways, media relay devices, bridges, load balancers, firewalls, inline service nodes, proxies, processors, modules, or any other suitable device, component, element, proprietary appliance, or object operable to exchange, receive, and transmit information in a network environment. A relay element, e.g., a TURN relay server or some other suitable relay candidate for forwarding/relaying traffic to an endpoint (and may or may not use a firewall traversal technique), can be provided in any one or more of these exemplary network elements. A PCP server can be provided in any or more of these exemplary network elements. These network elements may include any suitable hardware, software, components, modules, interfaces, or objects that facilitate the operations thereof. This may be inclusive of appropriate algorithms and communication protocols that allow for the effective exchange of data or information.

In one implementation, devices and systems described herein (device 802, PCP server 902, SecaaS/Turn Server 1002, and any components therein) may include software to achieve (or to foster) the functions discussed herein for enabling one or more policies to be enforced in the network where the software is executed on one or more processors to carry out the functions. This could include the implementation of instances of PCP client applications, connection agents, communication application, PCP server applications, policy applications, security applications, and any other suitable element that would foster the activities discussed herein. Additionally, each of these elements can have an internal structure (e.g., a processor, a memory element, etc.) to facilitate some of the operations described herein. In other embodiments, these functions for enabling smarter decisions using PCP may be executed externally to these elements, or included in some other network element to achieve the intended functionality. Alternatively, devices and systems described herein (device 802, PCP server 902, SecaaS/Turn Server 1002, and any components therein) may include software (or reciprocating software) that can coordinate with other network elements in order to achieve the smarter decisions using PCP functions described herein. In still other embodiments, one or several devices may include any suitable algorithms, hardware, software, components, modules, interfaces, or objects that facilitate the operations thereof.

In certain example implementations, the smarter decisions using PCP functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store state information for accommodating certain QoS characteristics mapped to a particular flow or data stream within a flow, one or more policies, etc.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the smarter decisions using PCP activities, as outlined herein. Additionally, each of these devices may include a processor that can execute software or an algorithm to perform the smarter decisions using PCP as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of smarter decisions using PCP within this particular architecture and context, but the examples should illustrate how the broad techniques can be potentially applied to a myriad of other architectures and contexts.

In one example implementation, any of the devices, PCP clients, PCP servers, SecaaS/TURN server, etc., comprises memory for storing information to be used in achieving the smarter decisions using PCP functions, as discussed herein. Additionally, any of devices and systems described herein (device 802, PCP server 902, SecaaS/Turn Server 1002, and any components therein) may include hardware instances of a processor that can execute software or an algorithm to perform the smarter decisions using PCP procedures, as disclosed in this Specification. These devices may further keep information (e.g., variables) in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the devices and systems described herein (device 802, PCP server 902, Secaas/Turn Server 1002, and any components therein) can also include suitable interfaces for receiving, transmitting, and/or otherwise communicating data or information in a network environment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

In one example embodiment, any number of embodiments disclosed herein may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element'. Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing *In re Paulson,* 30 F.3d 1475, 1480 (Fed. Cir. 1994), certain terms have been expressly defined herein. It is expressly intended that those terms have the definitions supplied, and that they not be given any interpretation inconsistent with those definitions.

What is claimed is:

1. A method comprising:
   receiving a request as to whether a client device can multiplex a plurality of streams into a single data flow that transmits the plurality of streams on a packet by packet basis in the single data flow according to per-packet flow prioritization, wherein each stream of the plurality of streams maintains its own packets, to yield a confirmation;
   determining, based on the confirmation that the client device can multiplex the plurality of streams into the single data flow, whether the client device is allowed to bundle at least one of the plurality of streams into the single data flow to yield a determination;

transmitting, based on the determination, a response indicating to the client device that bundling is allowed for the at least one of the plurality of streams, the response including a stream identifier based on the at least one of the plurality of streams; and enabling enforcement of different quality of service characteristics on different ones of the plurality of streams by classifying respective packets from respective streams of the plurality of streams and in the single data flow on a per-packet basis.

2. The method of claim 1, wherein the request includes a Port Control Protocol (PCP) option having a first identifier and/or a second identifier.

3. The method of claim 2,
wherein,
the first identifier identifies packets associated with a first stream of the plurality of streams and one or more first quality of service characteristics associated with the first stream, and
the second identifier identifies packets associated with a second stream of the plurality of streams and one or more second quality of service characteristics associated with the second stream different from the one or more first quality of service characteristics.

4. The method of claim 2, wherein each of the first identifier and the second identifier includes a differentiated service code point identifier.

5. The method of claim 2, wherein each of the first identifier and the second identifier includes a synchronization source identifier.

6. The method of claim 2, wherein each of the first identifier and the second identifier includes a payload type identifier.

7. The method of claim 1, wherein the response includes one or more service characteristics for the at least one of the plurality of streams.

8. The method of claim 1,
wherein,
the request is whether the client device can bundle the plurality of streams into the single data flow according to a 5-tuple comprising source Internet Protocol (IP) address, destination IP address, protocol, source port number, and destination port number, and
the determining the client device is allowed to bundle includes determining whether a network is configured to classify traffic on the per-packet basis.

9. A server comprising:
one or more processors;
one or more memory elements coupled to the one or more processors, the one or more memory elements storing at least one application that, when executed by the one or more processors, is configured to:
receive a request as to whether a client device can multiplex a plurality of streams into a single data flow that transmits the plurality of streams on a packet by packet basis in the single data flow according to per-packet flow prioritization wherein each stream of the plurality of streams maintains its own packets, to yield a confirmation,
determine, based on the confirmation that the client device can multiplex the plurality of streams into the single data flow, whether the client device is allowed to bundle at least one of the plurality of streams into the single data flow to yield a determination,
transmit, based on the determination, a response to the request indicating that bundling is allowed for the at least one of the plurality of streams, the response including a stream identifier based on the at least one of the plurality of streams, and
enable enforcement of different quality of service characteristics on different ones of the plurality of streams by classifying respective packets from respective streams of the plurality of streams and in the single data flow on a per-packet basis.

10. The server of claim 9,
wherein,
the request includes a Port Control Protocol (PCP) option having a first identifier and/or a second identifier,
the first identifier identifies packets associated with a first stream of the plurality of streams and one or more first quality of service characteristics associated with the first stream, and
the second identifier identifies packets associated with a second stream of the plurality of streams and one or more second quality of service characteristics associated with the second stream different from the one or more first quality of service characteristics.

11. The server of claim 10, wherein each of the first identifier and the second identifier includes a differentiated service code point identifier, a synchronization source identifier, and/or a payload type identifier.

12. The server of claim 9, wherein the response includes one or more service characteristics for the at least one of the plurality of streams.

13. The server of claim 9, wherein the request is whether the client device can bundle the plurality of streams into the single data flow according to a 5-tuple comprising source Internet Protocol (IP) address, destination IP address, protocol, source port number, and destination port number.

14. One or more computer-readable non-transitory media having logic encoded thereon that includes code for execution that, when executed by a processor, causes the processor to perform operations comprising:
receiving a request as to whether a client device can multiplex a plurality of streams into a single data flow that transmits the plurality of streams on a packet by packet basis in the single data flow according to per-packet flow prioritization, wherein each stream of the plurality of streams maintains its own packets, to yield a confirmation;
determining, based on the confirmation that the client device can multiplex the plurality of streams into the single data flow, whether the client device is allowed to bundle at least one of the plurality of streams into the single data flow to yield a determination;
transmitting, based on the determination a response to the request indicating that bundling is allowed for the at least one of the plurality of streams, the response including a stream identifier based on the at least one of the plurality of streams; and
enabling enforcement of different quality of service characteristics on different ones of the plurality of streams by classifying respective packets from respective streams of the plurality of streams and in the single data flow on a per-packet basis.

15. The media of claim 14,
wherein,
the request includes a Port Control Protocol (PCP) option having a first identifier and/or a second identifier,
the first identifier identifies packets associated with a first stream of the plurality of streams and one or more first quality of service characteristics associated with the first stream, and the second identifier identifies packets associated with a second stream of the plurality of streams and one or more second quality of service characteristics associated with the second stream different from the one or more first quality of service characteristics.

16. The media of claim 15, wherein each of the first identifier and the second identifier includes a differentiated service code point identifier, a synchronization source identifier, and/or a payload type identifier.

17. The media of claim 15, wherein the response includes one or more service characteristics for the at least one of the plurality of streams.

18. The media of claim 14, wherein the response includes one or more service characteristics for the at least one of the plurality of streams.

19. The media of claim 14, wherein the request is whether the client device can bundle the plurality of streams into the single data flow according to a 5-tuple comprising source Internet Protocol (IP) address, destination IP address, protocol, source port number, and destination port number.

* * * * *